Oct. 12, 1948.                    J. EVANS                    2,450,946
                    PULSE-ECHO RADIO VELOCITY INDICATOR
Filed April 25, 1944                                  2 Sheets-Sheet 1
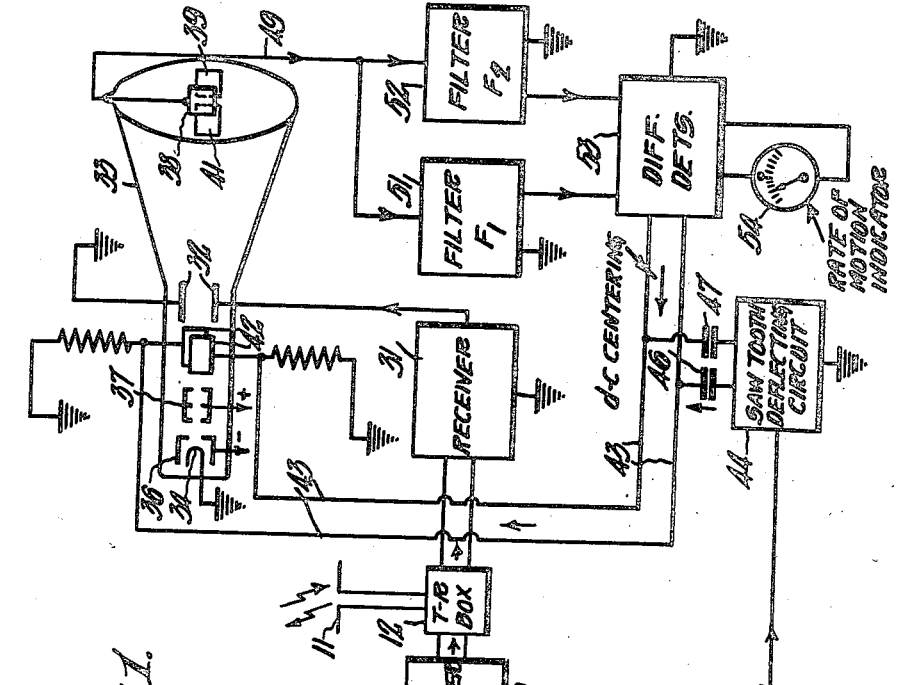
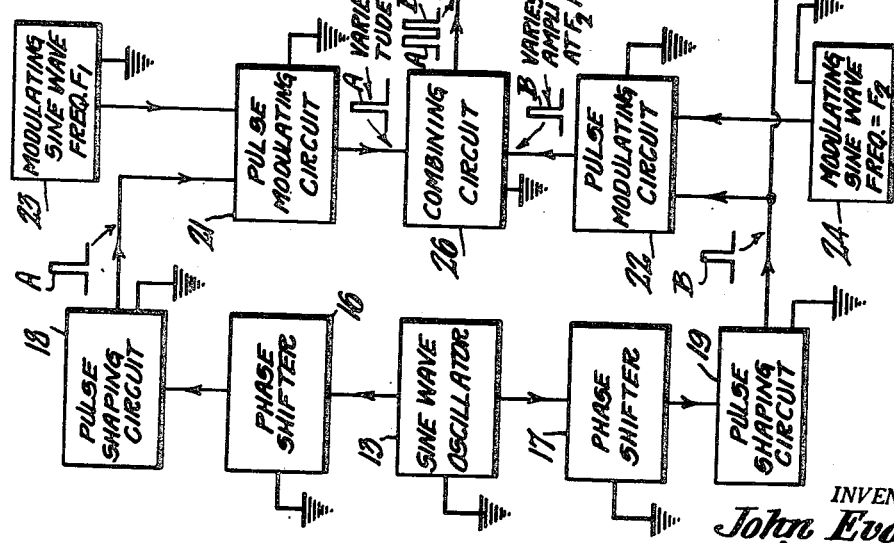
INVENTOR.
John Evans
BY
CD Nuska
ATTORNEY Oct. 12, 1948.    J. EVANS    2,450,946
PULSE-ECHO RADIO VELOCITY INDICATOR
Filed April 25, 1944    2 Sheets-Sheet 2

INVENTOR.
John Evans
BY
ATTORNEY

Patented Oct. 12, 1948

2,450,946

UNITED STATES PATENT OFFICE 2,450,946

PULSE-ECHO RADIO VELOCITY INDICATOR

John Evans, Kingston, N. J., assignor to Radio Corporation of America, a corporation of Delaware Application April 25, 1944, Serial No. 532,639

6 Claims. (Cl. 343—8)

My invention relates to radio locator systems and particularly to systems of the pulse-echo type.

An object of the present invention is to provide an improved method of and means for determining the speed of a moving object.

A further object of the invention is to provide an improved pulse-echo system for determining the speed and direction of motion of a moving object.

In a preferred embodiment of the invention a radio pulse transmitter is made to transmit pairs of pulses at a certain repetition rate. Each of the pulses in said pair is amplitude modulated at a certain frequency, a different modulation frequency being employed for each of the two pulses.

At the receiver, the paired pulses modulate a cathode ray that is deflected at the pulse repetition rate along a time axis trace that is adjacent to or on a mask and target electrode structure. When the paired pulse trace is centered with respect to the target electrode, none of the electrons of the cathode ray strike the target. As the pulse reflecting object comes closer, for example, the paired pulse indication moves towards the "zero" end of the time axis whereby the cathode ray, as modulated by one of the paired pulses, strikes the target electrode. This results in a current flow in a cathode ray centering circuit whereby the cathode ray is pulled back towards its centered position. The amount of centering current, which may be indicated by a direct-current voltmeter, is a measure of the rate and direction of movement of the pulse reflecting object.

Figure 3:
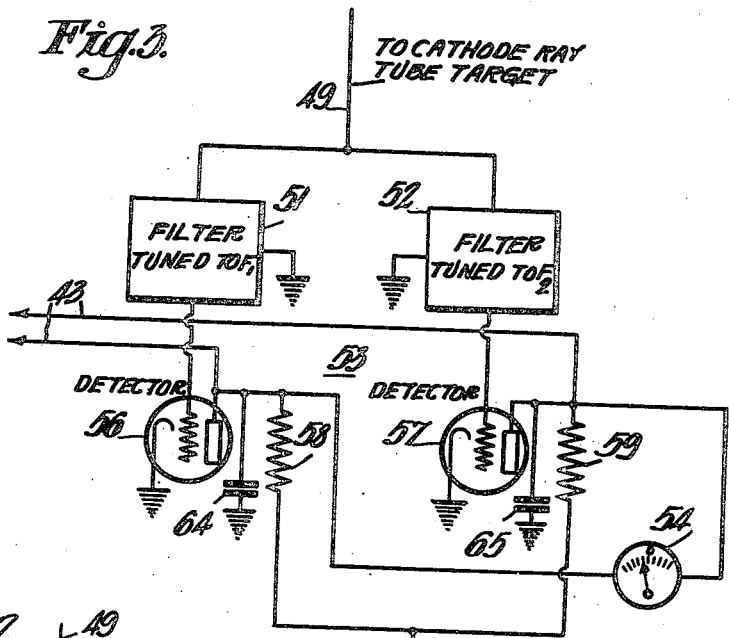
Figure 2:
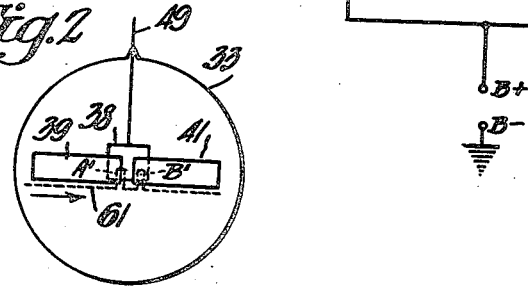
Figure 4:
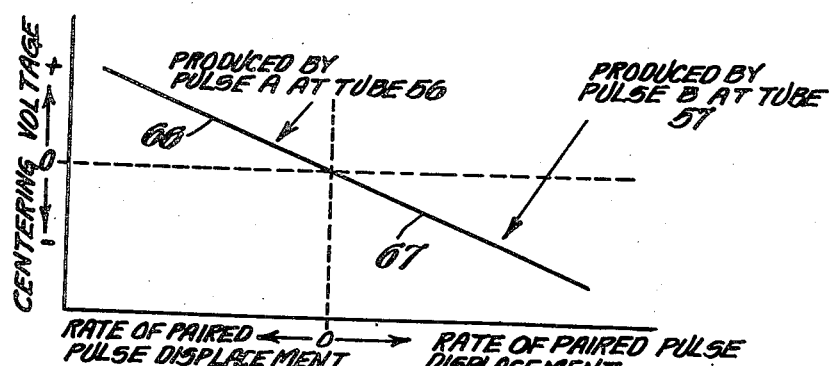

The invention will be better understood from the following description taken in connection with the accompanying drawing in which Figure 1 is a block and circuit diagram of one embodiment of the invention, Figure 2 is a schematic view of the target electrode and mask of the cathode ray tube shown in Fig. 1, Figure 3 is a block and circuit diagram of the differential detector circuit shown in Fig. 1, and Figure 4 is a graph that is referred to in explaining the operation of the system shown in Fig. 1.

Referring to Fig. 1, a radio transmitter 10 is pulse modulated by a periodically recurring pair of pulses A and B which are amplitude modulated at different frequency rates $F_1$ and $F_2$, respectively. The radio pulses are radiated from an antenna 11 which may also be utilized for pulse reception by providing a transmit-receive or T-R box 12 of conventional design. The function of the T-R box 12 is to short or, effectively to open, the line to the receiver during the transmission of a pulse. Separate antennas for transmission and reception may be employed, if preferred.

Referring to the circuit for producing the pulses A and B, a sine wave oscillator 13, which oscillates at the desired pulse repetition rate, supplies sine wave current to phase shifters 16 and 17. The phase shifters 16 and 17 are adjusted to make their sine wave outputs have a phase difference equal to the desired time difference between the pulses A and B. The sine waves from phase shifters 16 and 17 are applied to pulse forming or pulse shaping circuits 18 and 19, respectively. Any one of many well known pulse forming circuits may be utilized at 18 and 19. Such a circuit may include a Thyratron that is triggered by the applied sine wave for shorting a pulse forming delay line or it may include a blocking oscillator that is triggered by the sine wave to produce pulses that are shaped to the desired width, etc., in a conventional manner.

The pulses A and B are applied to pulse modulating tubes or circuits 21 and 22, respectively, to which are applied modulating sine waves of frequencies $F_1$ and $F_2$ from sine wave sources 23 and 24, respectively. The modulating sine wave may be applied to the anode of a modulating tube while the pulse is applied to the grid of the modulating tube, for example. The frequencies $F_1$ and $F_2$ might be 50 and 100 cycles per second, respectively, and the pulse repetition rate several thousand pulses per second, for example.

The amplitude modulated pulses A and B are combined in a suitable combining or mixing circuit 26 and the resulting pairs of pulses A and B (the pair occurring at the pulse repetition rate) are applied to the radio transmitter 10 to pulse modulate the carrier wave.

The pulses reflected from the moving object are picked up by the antenna 11 and supplied to a radio receiver 31 which demodulates the received signal and supplies the amplitude modulated pulses A and B to the vertical deflecting plates 32 of a cathode ray tube 33.

The cathode ray tube 33 comprises a cathode 34, a control grid 36, an anode 37 and a target electrode 38. A pair of masks 39 and 41 are positioned between the electrode 38 and the electron gun 34, 36, 37 with a spacing between the masks whereby the electron beam may strike the target 38 under certain conditions described hereinafter. The tube 33 also includes a pair of horizontal deflecting plates 42. A sawtooth deflecting voltage is applied over a pair of conductors 43 to the plate 42 from a sawtooth wave generator 44. The connection from the generator 44 to the conductors 43 may be through coupling capacitors 46 and 47. Synchronization of the sawtooth wave generator 44 with the pulse transmission may be maintained by supplying the pulses B over a conductor 48 to the generator 44.

The target electrode 38 is connected to an output conductor 49 which supplies electron beam current through one or the other of a pair of tuned filter circuits 51 and 52 to a differential detector circuit 53 whenever the electron beam strikes the target 38. The filters 51 and 52 are tuned to the frequencies F₁ and F₂, respectively, to pass currents at these frequencies only. The differential detector circuit 53 (shown in detail in Fig. 3) supplies a direct-current voltage over the conductors 43 to the deflecting plates 42 for centering the electron beam. The amount and polarity of this centering current is indicated by a direct-current voltmeter 54 whereby the rate and direction of motion of the pulse reflecting object is indicated as explained below.

As shown in Fig. 3, the differential detector circuit 53 may comprise detector tubes 56 and 57 having their control grids connected to the filters 51 and 52, respectively. A direct-current operating voltage is supplied to the anodes of tubes 56 and 57 through anode resistors 58 and 59, respectively. The anodes of the tubes 56 and 57 are connected through the conductors 43 to the horizontal deflecting plates 42. The direct-current voltmeter 54 is connected between the anodes of the detector tubes 56 and 57.

Since the amount of direct-current flow through the anode resistors 58 and 59 depends upon the amount of signal applied to the control grids of the corresponding detector tubes, there will be a direct-current centering voltage applied through the conductors 43 to the deflecting plates 42 that depends on the said applied signal. This D.-C. voltage is measured by the meter 54 to indicate the rate and direction of motion of the pulse reflecting object.

The operation of the system will be more clearly understood by referring to Fig. 2 where the cathode ray trace is represented by the broken line 61. Here it is assumed that the electron beam is deflected left to right (looking from the electron gun toward the target 38). In the absence of a received pulse, the beam trace is below the masks 39 and 41 and the target 38. Upon the reception of a reflected pulse, the beam is deflected upwardly and held there for the duration of the pulse. Thus the beam trace produced by pulses A and B is indicated at A' and B'.

If the pulse traces A' and B' are centered with respect to the gap between the masks 39 and 41, no beam electrons strike the target 38 and no current is supplied over the conductor 49. If, however, the traces A' and B' are off center as illustrated in Fig. 2, the beam is deflected upwardly onto the target 38 by one of the pulses (by pulse A in the example shown). Since the recurring A pulses are amplitude modulated, the result of the off-center condition illustrated will be that the electron beam will strike the target 38 during a high amplitude modulation period or instant of the A pulses but will fail to strike it or will strike it for a shorter time during the low amplitude modulation period or instant. Thus, a current which varies at the modulation frequency F₁ appears in the conductor 49, passes through the filter 51 (but not through filter 52) and causes a decrease (or increase depending upon the type of detector) in the D.-C. anode current of detector 56. Any alternating current in the detector tube outputs is filtered out by the bypass capacitors 64 and 65. The resulting D.-C. differential voltage on the conductors 43 substantially centers the traces A' and B' and holds them centered, only enough of the right hand edge of the trace A' striking the target to maintain this condition. The faster the reflecting object is moving, the greater is the amount of centering voltage required to maintain the centered condition, and the greater is the deflection of the meter 54. Thus the meter 54 may be calibrated to indicate directly the speed of the reflecting object.

If the reflecting object is moving in the opposite direction, the reverse centering action takes place, that is, the trace B' now strikes the target 38, current passes through the filter 52 only, and a centering voltage of reversed polarity is applied through the conductors 43 to the horizontal deflecting plates 42. The reading of the meter 54 is now reversed with respect to the previous reading and the value of the reading indicates its speed.

The above described centering action of the differential detector circuit is illustrated in Fig. 4 where the graph 66 illustrates how the centering voltage changes at the anode of tube 56 for different speeds of a reflecting object travelling in one direction, and where the graph 67 illustrates how the centering voltage changes at the anode of the tube 57 in the case where the object is travelling in the opposite direction.

It will be apparent that the invention is not limited to the specific circuit illustrated. For example, the output of the receiver 31 may be applied to the control grid 36 of the cathode ray tube instead of to the vertical deflecting plates 32. Then with the electron gun biased to electron beam cut-off in the absence of a received pulse, and with the beam positioned to sweep across the masks 39 and 41 and the target 38, the beam electrons will strike the target 38 during the reception of either the pulse A or the pulse B if the reflecting object is moving. Thus, the centering action is the same as in the example illustrated.

I claim as my invention:

1. In a system wherein there is a cathode ray tube having means for producing an electron beam, the method of determining the speed of a moving object which comprises producing regularly recurring radio pulses, transmitting said pulses toward said object, receiving said pulses after reflection, modulating said electron beam by said received pulses while sweeping it along a time axis in synchronism with the pulse transmission, utilizing the electrons of said beam during the electron beam modulation by said pulses to center the beam trace of said pulses on said time axis, and indicating the resulting amount of centering control whereby the rate of motion of said object is indicated.

2. In a system for determining the speed of a moving object, means for producing regularly recurring radio pulses, means for transmitting said pulses toward said object, means for receiving said pulses after reflection, a cathode ray tube and means for producing an electron beam therein, means for sweeping said beam along a time axis in synchronism with the pulse transmission, means for modulating said beam by said received pulses, means comprising a target electrode in said cathode ray tube for utilizing the electrons of said beam during the electron beam modulation by said pulses to produce a centering voltage, means for deflecting said beam by said centering voltage to center the beam trace of said pulses on said time axis, and means for indicating the resulting amount of centering voltage whereby the rate of motion of said object is indicated.

3. The method of determining the speed of a moving object which comprises producing regularly recurring pairs of radio pulses, modulating each of the pulses of said pair at a different frequency, transmitting said pulses toward said object, receiving said pulses after reflection, modulating an electron beam by said received pulses while sweeping it along a time axis in synchronism with the pulse transmission, utilizing the electrons of said beam during the electron beam modulation by one of the pulses in said pair to center the beam trace of said reflected pair of pulses on said time axis, and indicating the resulting amount of centering control whereby the rate of motion of said object is indicated.

4. The method of determining the speed of a moving object which comprises producing regularly recurring pairs of radio pulses, amplitude modulating each of the pulses of said pair at a different frequency rate, transmitting said pulses toward said object, receiving said pulses after reflection, deflecting an electron beam vertically by said received pulses while sweeping it along a horizontal time axis in synchronism with the pulse transmission, utilizing the electrons of said beam during said vertical deflection of the electron beam by one of the pulses in said pair to center the beam trace of said reflected pair of pulses on said time axis, and indicating the resulting amount of centering control whereby the rate of motion of said object is indicated.

5. In a system for determining the speed of a moving object, means for producing regularly recurring pairs of radio pulses, means for modulating each of the pulses of said pair at a different frequency, means for transmitting said pulses toward said object, means for receiving said pulses after reflection from said object, a cathode ray tube and means for producing an electron beam therein, means for sweeping said beam along a time axis in synchronism with the pulse transmission, means for modulating said beam by said received pulses, means comprising a target electrode in said cathode ray tube which is positioned to be struck by the electrons of said beam during the modulation thereof by one of the pulses in said pair for producing a centering voltage, means for deflecting said beam along said time axis by said centering voltage to center the beam trace of said reflected pair of pulses on said time axis, and means for indicating the resulting amount of centering voltage whereby the rate of motion of said object is indicated.

6. In a system for determining the speed of a moving object, means for producing regularly recurring pairs of radio pulses, means for modulating each of the pulses of said pair at a different frequency rate, means for transmitting said pulses toward said object, means for receiving said pulses after reflection from said object, a cathode ray tube and means for producing an electron beam therein, means for sweeping said beam along a time axis in synchronism with the pulse transmission, means for modulating said beam by said received pulses to produce two pulse traces, a target electrode in said cathode ray tube, centering circuit means for centering said traces with respect to said target, said target being positioned so that it is struck by one or the other of said pulse traces in response to said traces getting off center, means for deflecting said beam by the output of said centering circuit to center the two pulse traces with respect to said target in response to said traces getting off center, and means for indicating the resulting centering circuit output whereby the rate of motion of said object is indicated.

JOHN EVANS.

REFERENCES CITED

The following references are of record in the file of this patent:

UNITED STATES PATENTS

| Number | Name | Date |
|---|---|---|
| 1,924,156 | Hart | Aug. 29, 1933 |
| 1,945,952 | Nicolson | Feb. 6, 1934 |
| 2,143,035 | Smith | Jan. 10, 1939 |
| 2,314,302 | Ziebolz | Mar. 16, 1943 |